(12) United States Patent
Eriksson

(10) Patent No.: US 7,239,621 B2
(45) Date of Patent: Jul. 3, 2007

(54) PHYSICAL CHANNEL RELATION SYSTEM/METHOD FOR USE IN CELLULAR TELECOMMUNICATIONS NETWORK

(75) Inventor: Göran Eriksson, Umeá (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 855 days.

(21) Appl. No.: 10/000,803

(22) Filed: Dec. 4, 2001

(65) Prior Publication Data

US 2003/0103478 A1 Jun. 5, 2003

(51) Int. Cl.
*H04B 7/216* (2006.01)
(52) U.S. Cl. .................. 370/335; 370/342; 370/441
(58) Field of Classification Search ............... 370/335, 370/342
See application file for complete search history.

(56) References Cited

U.S. PATENT DOCUMENTS

| | | | |
|---|---|---|---|
| 5,396,543 A | 3/1995 | Beeson, Jr. et al. | |
| 5,475,868 A | 12/1995 | Duque-Anton et al. | |
| 5,490,135 A | 2/1996 | Hiraiwa et al. | |
| 5,537,457 A | 7/1996 | Lantto et al. | |
| 6,738,624 B1* | 5/2004 | Aksentijevic et al. | 455/452.1 |
| 6,778,812 B1* | 8/2004 | Zhang | 455/67.13 |
| 6,795,689 B1* | 9/2004 | Ogren et al. | 455/67.13 |
| 6,889,050 B1* | 5/2005 | Willars et al. | 455/452.2 |
| 2001/0055298 A1* | 12/2001 | Baker et al. | 370/349 |
| 2002/0049062 A1* | 4/2002 | Petersen | 455/453 |
| 2002/0051440 A1* | 5/2002 | Houzel | 370/338 |
| 2003/0031145 A1* | 2/2003 | Zeira et al. | 370/335 |
| 2003/0035394 A1* | 2/2003 | Zeira et al. | 370/335 |
| 2003/0099282 A1* | 5/2003 | Magnusson | 375/140 |
| 2004/0213297 A1* | 10/2004 | Isokangas et al. | 370/535 |
| 2005/0063347 A1* | 3/2005 | Sarkkinen et al. | 370/338 |

FOREIGN PATENT DOCUMENTS

| | | |
|---|---|---|
| WO | WO 98/57513 | 12/1998 |
| WO | WO 01/63952 | 8/2001 |

OTHER PUBLICATIONS

Siemens Italtel, Aug. 27, 1999, Sophia Antipolis, France, TSGR3#6(99) 964, p. 1-5.*
3rd Generation Partnership Project; Technical Specification Group Radio Access Network; "UTRAN lub Interface NBAP Signalling", 1999.

(Continued)

*Primary Examiner*—Chirag G. Shah
(74) *Attorney, Agent, or Firm*—Nixon & Vanderhye P.C.

(57) ABSTRACT

In a cellular telecommunications network, a base station (BS) utilizes parameter(s) included in a received transport channel setup message (e.g., in a received COMMON TRANSPORT CHANNEL SETUP REQUEST message) in order to determine whether or not the physical channel identified in the setup message is already being used by another transport channel(s). Parameters included in the received setup message which may be utilized by the BS in making such a determination include, for example, cell ID, cell carrier ID, downlink scrambling code ID, downlink channelization code number or ID, and the like. The determined information may be used to check the consistency of setup messages received by the BS and/or to enable more efficient hardware configurations of such setups at the BS. Alternatively, the determined information may be used to decide whether to reject a requested physical channel setup request in other embodiments of this invention.

18 Claims, 8 Drawing Sheets

OTHER PUBLICATIONS

3rd Generation Partnership Project; Technical Specification Group Radio Access Network; "Physical Channels and Mapping of Transport Channels Onto Physical Channels (FDD)", 1999.

EPO Standard Search Report dated Apr. 18, 2002.

Haardt et al., "The Physical Layer of Ultra TDD", VTC 2000, pp. 1175-1180, XP-000968055.

* cited by examiner

Frame structure for Secondary Common Control Physical Channel

Fig. 4

Secondary CCPCH fields

| Slot Format #i | Channel Bit Rate (kbps) | Channel Symbol Rate (ksps) | SF | Bits/Frame | Bits/Slot | $N_{data}$ | $N_{pilot}$ | $N_{TFCI}$ |
|---|---|---|---|---|---|---|---|---|
| 0 | 30 | 15 | 256 | 300 | 20 | 20 | 0 | 0 |
| 1 | 30 | 15 | 256 | 300 | 20 | 12 | 8 | 0 |
| 2 | 30 | 15 | 256 | 300 | 20 | 18 | 0 | 2 |
| 3 | 30 | 15 | 256 | 300 | 20 | 10 | 8 | 2 |
| 4 | 60 | 30 | 128 | 600 | 40 | 40 | 0 | 0 |
| 5 | 60 | 30 | 128 | 600 | 40 | 32 | 8 | 0 |
| 6 | 60 | 30 | 128 | 600 | 40 | 38 | 0 | 2 |
| 7 | 60 | 30 | 128 | 600 | 40 | 30 | 8 | 2 |
| 8 | 120 | 60 | 64 | 1200 | 80 | 72 | 0 | 8* |
| 9 | 120 | 60 | 64 | 1200 | 80 | 64 | 8 | 8* |
| 10 | 240 | 120 | 32 | 2400 | 160 | 152 | 0 | 8* |
| 11 | 240 | 120 | 32 | 2400 | 160 | 144 | 8 | 8* |
| 12 | 480 | 240 | 16 | 4800 | 320 | 312 | 0 | 8* |
| 13 | 480 | 240 | 16 | 4800 | 320 | 296 | 16 | 8* |
| 14 | 960 | 480 | 8 | 9600 | 640 | 632 | 0 | 8* |
| 15 | 960 | 480 | 8 | 9600 | 640 | 616 | 16 | 8* |
| 16 | 1920 | 960 | 4 | 19200 | 1280 | 1272 | 0 | 8* |
| 17 | 1920 | 960 | 4 | 19200 | 1280 | 1256 | 16 | 8* |

*Fig. 5*

Timing relation between PICH frame and associated S-CCPCH frame

PHYSICAL CHANNEL RELATION SYSTEM/METHOD FOR USE IN CELLULAR TELECOMMUNICATIONS NETWORK

FIELD OF THE INVENTION

The present invention relates to cellular radio communications, and more particularly, to relations between physical channels used by a radio network controller (RNC) and/or radio base station (BS) in a cellular telecommunications network. The invention finds one example application in Wideband Code Division Multiple Access (WCDMA) communications systems.

BACKGROUND AND SUMMARY OF THE INVENTION

Direct Sequence Code Division Multiple Access (DS-CDMA) allows signals to overlap in time and frequency so that CDMA signals from multiple users simultaneously operate in the same frequency band or spectrum. In principle, a source information digital data stream to be transmitted is impressed upon a much higher rate data stream generated by a pseudo-random noise (PN) code generator. This combination of a higher bit rate code signal with a lower bit rate information stream "spreads" the bandwidth of the information data stream. Each information data stream is allocated a unique PN or spreading code (or a PN code having a unique offset in time) to produce a signal that can be separately received at a receiving station. From a received composite signal of multiple, differently-coded signals, a PN coded information signal is isolated and demodulated by correlating the composite signal with a specific PN spreading code associated with that PN coded information signal. This inverse, de-spreading operation "compresses" the received signal to permit recovery of the original data and at the same time suppress interference from other users.

Wideband CDMA systems contain one or several radio frequency carriers. Each radio frequency carrier contains a number of spreading codes which may be allocated to provide different data rates to satisfy different mobile user requirements. Some of those spreading codes are used for traffic channels and some are used for common control channels such as random access channels, paging channels, broadcast channels, etc. In order to provide flexibility in how bandwidth and other radio resources are allocated in wideband CDMA systems, a "logical" cell is defined. Such a logical cell may be allocated one or more radio frequency carrier(s) thereby permitting resources associated with different carriers belonging to the same cell to be allocated, for example, to a single mobile station (MS or UE) such as a cell phone requiring a high bit rate connection. The additional carrier(s) effectively provide more traffic channels.

WCDMA systems often utilize transport channels which may be mapped to physical channels. The physical layer (layer 1) is the lowest layer in the OSI Reference Model and it supports functions required for the transmission of bit streams on the physical medium. Thus, the physical layer offers data transport services to higher layers. Access to these services is provided through the use of transport channels via the MAC sub-layer. Characteristics of a transport channel are defined by its transport format (or format set), specifying the physical layer processing to be applied to the transport channel in question, such as convolutional channel coding and interleaving, and any service-specific rate matching as may be needed. Thus, transport channels may represent services offered by Layer 1 to the higher layers.

Exemplary transport channels include (i) common transport channels such as BCH (broadcast channel, often used as a downlink (DL) transport channel to broadcast system and/or cell specific information), FACH (forward access channel), PCH (paging channel), RACH (random access channel), CPCH (common packet channel), and DSCH (downlink shared channel), and (ii) dedicated channels (DCH) which may be used on the uplink or downlink. The FACH transport channel is typically known as a downlink channel, and transmitted over an entire cell or over only part of a cell using a beam-forming antenna. The PCH transport channel is typically known as a downlink (DL) channel transmitted over a cell, and is associated with the transmission of physical layer generated paging indicators (e.g., to support efficient sleep-mode procedures).

It is known that on the DL the PCH and FACH transport channels may be combined on the same physical channel such as on the SCCPCH (Secondary Common Control Physical Channel). This may be achieved in the context of a cellular telecommunications network using a COMMON TRANSPORT CHANNEL SETUP REQUEST message sent from an RNC to a BS. The BS receives this message, and in response thereto configures itself so as to support its activation of the SCCPCH. Once activated, the SCCPCH exists on the interface between the BS and mobile stations in the cell(s) of the BS.

Unfortunately, the COMMON TRANSPORT CHANNEL SETUP REQUEST message may not include any information indicative of whether any other transport channel(s) (e.g., RACH) is/are using the same physical channel identified in the COMMON TRANSPORT CHANNEL SETUP REQUEST message. If another transport channel(s) is/are already using the same physical channel, then the requested set-up of the SCCPCH becomes more difficult. Additionally, problems can also arise from inconsistent channel assignment messages received by a BS from an RNC.

Accordingly, it will be apparent to those skilled in the art that there exists a need in the art for a system and/or method for determining whether or not a physical channel identified in a transport channel set-up request message is already being used by another transport channel. There also exists a need in the art for a system and/or method for checking the consistency of messages received by a BS from an RNC or other node(s) (e.g., to reduce the likelihood of inconsistent channel assignments for physical channels).

According to an exemplary embodiment of this invention, a base station (BS) in a cellular telecommunications network utilizes parameter(s) included in a received transport channel setup message (e.g., in a received COMMON TRANSPORT CHANNEL SETUP REQUEST message) in order to determine whether or not the physical channel identified in the setup message is already being used by another transport channel(s). Parameters included in the received setup message which may be utilized by the BS in making such a determination include, for example, cell ID, cell carrier ID, downlink scrambling code ID, downlink channelization code number or ID, and the like. The BS may use this determined information to monitor the consistency of physical channel setup messages received from a node such as an RNC (e.g., to make sure that the same channel identity is not set up several times and/or to reduce the likelihood of inconsistent channel assignments for physical channels). Optionally, the BS may also use this determined information (e.g., if it is determined that the same physical channel is already being used by another transport channel) to either (i) more efficiently configure the hardware (e.g., hardware on Tx/Rx board(s) of the BS), or (ii) deny or reject the requested setup.

BRIEF DESCRIPTION OF THE DRAWINGS

The foregoing and other objects, features, and advantages of the invention will be apparent from the following description of preferred example embodiments as well as illustrated in the accompanying drawings in which reference characters refer to the same parts. While individual functional blocks and components are shown in many of the figures, those skilled in the art will appreciate that these functions may be performed by individual hardware circuits, by a suitably programmed digital microprocessor or general purpose computer, by an application-specific integrated circuit (ASIC), and/or by one or more digital signal processors (DSPs).

DETAILED DESCRIPTION OF THE DRAWINGS

In the following description, for purposes of explanation and not limitation, specific details are set forth, such as particular embodiments, network architectures, signaling formats, techniques, etc., in order to provide an understanding of the present invention. However, it will be apparent to one skilled in the art that the present invention may be practiced in other embodiments that depart from these specific details. Detailed descriptions of well-known methods, interfaces, devices, protocols, and signaling techniques are omitted so as not to obscure the description of the present invention with unnecessary detail.

This invention relates to a system and method for a node such as a base station (BS) in a cellular telecommunications network to utilize parameter(s) included in a received transport channel setup message (e.g., in a received COMMON TRANSPORT CHANNEL SETUP REQUEST message) to determine whether or not the physical channel identified in the setup message is already being used by another transport channel(s). Parameters included in the received setup message which may be utilized by the BS in making such a determination include, for example, cell ID, cell carrier ID (optional), downlink scrambling code ID (e.g., one for each physical channel), downlink channelization code number or ID (e.g., one for each scrambling code), physical channel ID, transport channel(s) ID, and the like. The BS may use this determined information to monitor the consistency of physical channel setup messages received from a node such as an RNC (e.g., to make sure that the same channel identity is not set up several times). Optionally, the BS may also use this determined information (e.g., if it is determined that the same physical channel is already being used by another transport channel) to either (i) more efficiently configure the hardware (e.g., hardware on Tx/Rx boards of the BS), and/or (ii) deny or reject the requested setup.

Figure 3:
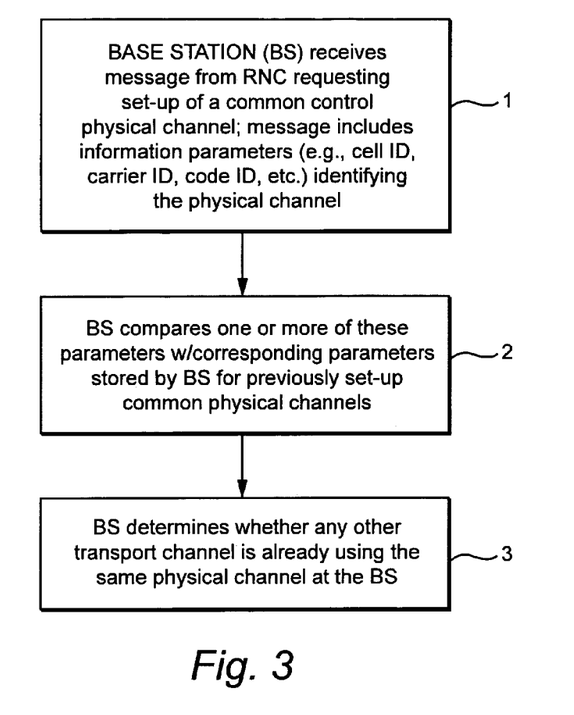
FIG. 3 is a flowchart illustrating certain steps which may be carried out in accordance with an embodiment of this invention.

FIG. 3 illustrates certain steps carried out in accordance with an exemplary embodiment of this invention. Initially, a telecommunications network including a plurality of nodes (e.g., RNC nodes, BS nodes, etc.) is provided. One node (e.g., BS node) receives a physical channel setup message (e.g., COMMON TRANSPORT CHANNEL SETUP REQUEST message) from another node (e.g., from an RNC node) in step 1. This message requests that the one node (e.g., BS node) set up a physical channel such as a SCCPCH by configuring its hardware accordingly. The received message includes parameters that can be used by the BS to identify the physical channel which is the subject of the setup request. These parameters may include, for example, call ID, cell carrier ID, downlink (DL) scrambling code, DL channelization code number or ID, etc.

The BS stores in its memory parameter information associated with all common physical channels that it has previously set up and/or is using. Thus, in step 2 the receiving node (e.g., BS) compares at least certain of the parameters received in the setup request with parameters already stored in its memory which relate to common physical channels already set up and/or in use by the receiving node (e.g., BS). Using the comparison result from step 2, the receiving node (e.g., BS) in step 3 determines whether or not any other transport channel at the BS is already using (or is set up for using) the same physical channel identified by the parameters in the received setup request message. As explained above, this determined information may be used to continuously check the consistency of received setup messages. Alternatively, this determined information may in certain embodiments be used to provided for more efficient node hardware configuration for the new physical channel, and may even be used to deny a channel setup request in certain circumstances.

The invention of FIG. 3 may be used, for example and without limitation, in the context of a WCDMA system. While a WCDMA context is preferred, it is stressed that WCDMA is provided for purposes of example only and that this invention may also be utilized in other types of systems where setups of different physical channels are used. Accordingly, reference is made to FIGS. 1–2 and 4–10 for a description of an exemplary WCDMA system and/or network in which this invention may be utilized.

Figure 1:
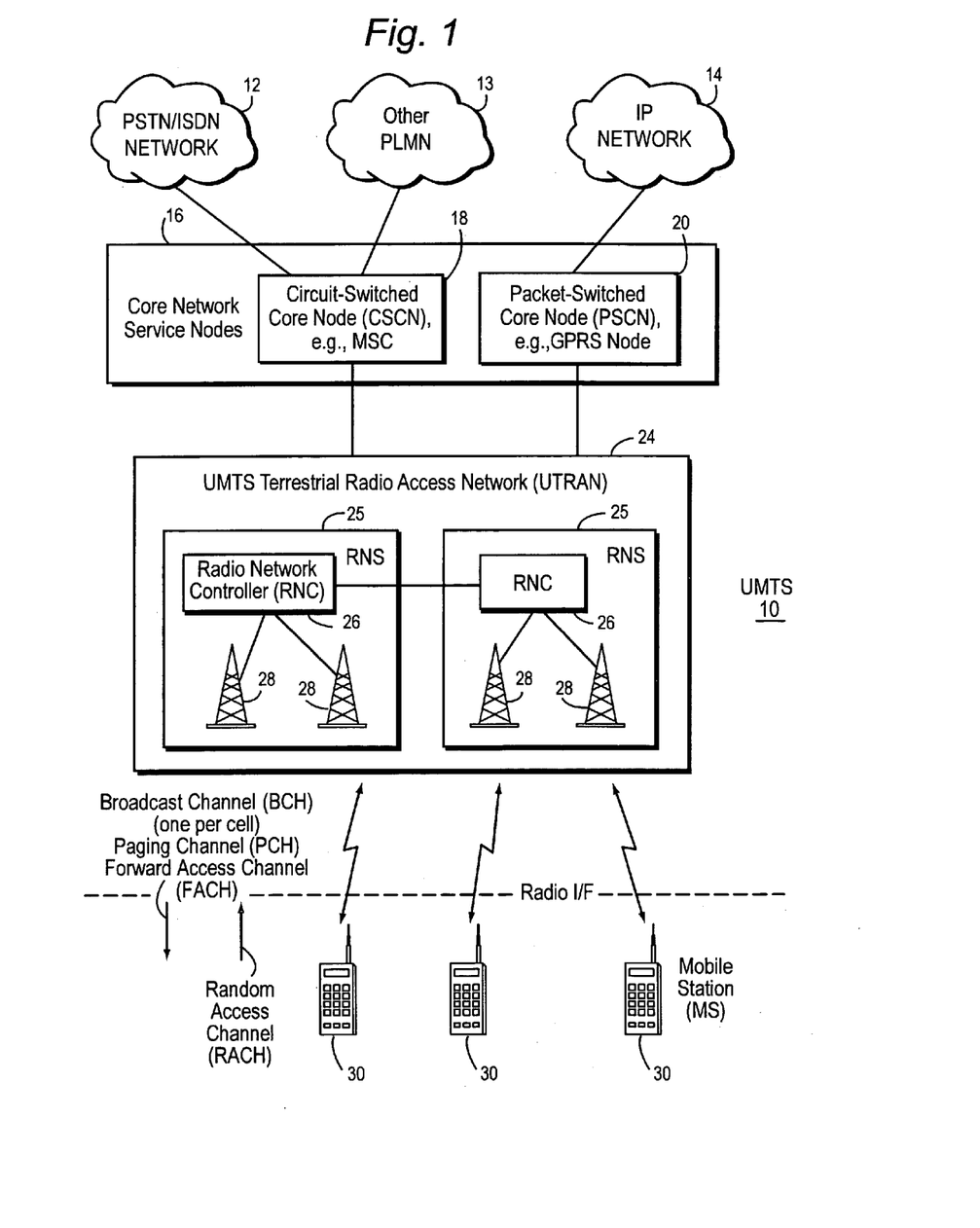
FIG. 1 is a function block diagram illustrating a universal mobile telephone system (UMTS) employing a UMTS terrestrial radio access network (UTRAN) in which the present invention may be advantageously employed.

One example of a wideband CDMA system is the universal mobile telecommunications system (UMTS) 10 shown in FIG. 1. A representative, circuit-switched, external core network, shown as a cloud 12 may be for example the public switched telephone network (PSTN) and/or the integrated services digital network (ISDN). Another circuit-switched, external core network may correspond to another Public Land Mobile radio Network (PLMN) 13. A representative, packet-switched, external core network shown as cloud 14 may be for example an IP network such as the Internet. The core networks are coupled to corresponding network service nodes 16. The PSTN/ISDN network 12 and other PLMN network(s) 13 are connected to a circuit-switched core node (CSCN) 18, such as a Mobile Switching Center (MSC), that provides circuit-switched services. The UMTS 10 may co-exist with an existing cellular network, e.g., the Global System for Mobile Communications (GSM). The packet-switched network 14 is connected to a packet-switched core node (PSCN), e.g., a General Packet Radio Service (GPRS) node 20 tailored to provide packet-switched type services in the context of GSM which is sometimes referred to as the Serving GPRS Service Node (SGSN). Each of the core network service nodes 18 and 20 connects to a UMTS terrestrial radio access network (UTRAN) 24 over a radio access network interface. The UTRAN 24 includes one or more radio network systems (RNS) 25 each with a radio network controller (RNC) 26 coupled to a plurality of base stations (BS) 28 and to the RNCs 26 in the UTRAN 24.

Preferably, radio access over the radio interface (radio I/F) in the UMTS 10 is based upon wideband, Code Division Multiple Access (WCDMA) with individual radio channels allocated using CDMA spreading codes which may each include both a channelization code and a scrambling code. Channelization codes may be Orthogonal Variable Spreading Factor (OVSF) codes that preserve the orthogonality between DL channels of different rates and/or spreading factors. Channelization codes may be assigned by the UTRAN in certain embodiments of this invention. WCDMA provides wide bandwidth for multimedia services and other high transmission rate demands as well as robust features like diversity handoff and RAKE receivers to ensure high quality communication service in a frequently changing environment.

Each mobile station (MS) 30 is assigned its own spreading code in order for a base station (BS) 28 to identify transmissions from that particular mobile station. The mobile station also uses its own spreading code to identify transmissions from the base station either on a general broadcast or common channel or transmissions specifically intended for that mobile station. That spreading code distinguishes the spread signal from all of the other transmissions and noise present in the same area. In FIG. 1, different types of control channels are shown bridging the radio interface I/F. For example, in the forward or downlink direction, there are several types of common transport channels including a general broadcast channel (BCH), (there is only one broadcast channel per cell), a paging channel (PCH), and a forward access channel FACH. As explained above, a physical channel such as the SCCPCH may include both the PCH and the FACH. In the reverse or uplink direction, a random access channel (RACH) is employed by mobile stations whenever access is desired to perform location registration, call origination, page response, and other types of access operations.

In general, each radio controller includes a memory coupled to data processing circuitry that performs numerous radio and data processing operations required to perform its control function and conduct communications between the RNC and other entities such as the core network service nodes, other RNCs and base stations 28. Data processing circuitry may include any one or a combination of suitable programmed or configured general purpose computer, microprocessor, microcontroller, dedicated logic circuitry, DSP, ASCI, etc. The base station 28 similarly includes data processing and control circuitry, which in addition performs processing operations relating to communications with the RNC, and performs a number of measurements in control operations associated with radio base station equipment. Data processing, memory, and transceiving circuitry is employed in each mobile station 30. The mobile station 30 also includes a user interface with a speaker, microphone, keypad, display, and is typically powered by a battery.

Each base station (BS) 28 shown FIG. 1 may include one or more physical sectors, with each sector providing coverage for a certain geographical area associated with the base station. For example, each of three sectors may include a corresponding antenna(s), transceiving hardware (Tx/Rx), and data and signal processing hardware to permit wideband-CDMA communications with mobile stations 30. Each sector may be mapped to one or more logical cells, and each cell may have one or more radio frequency carriers (i.e., call carrier(s)).

Figure 2:
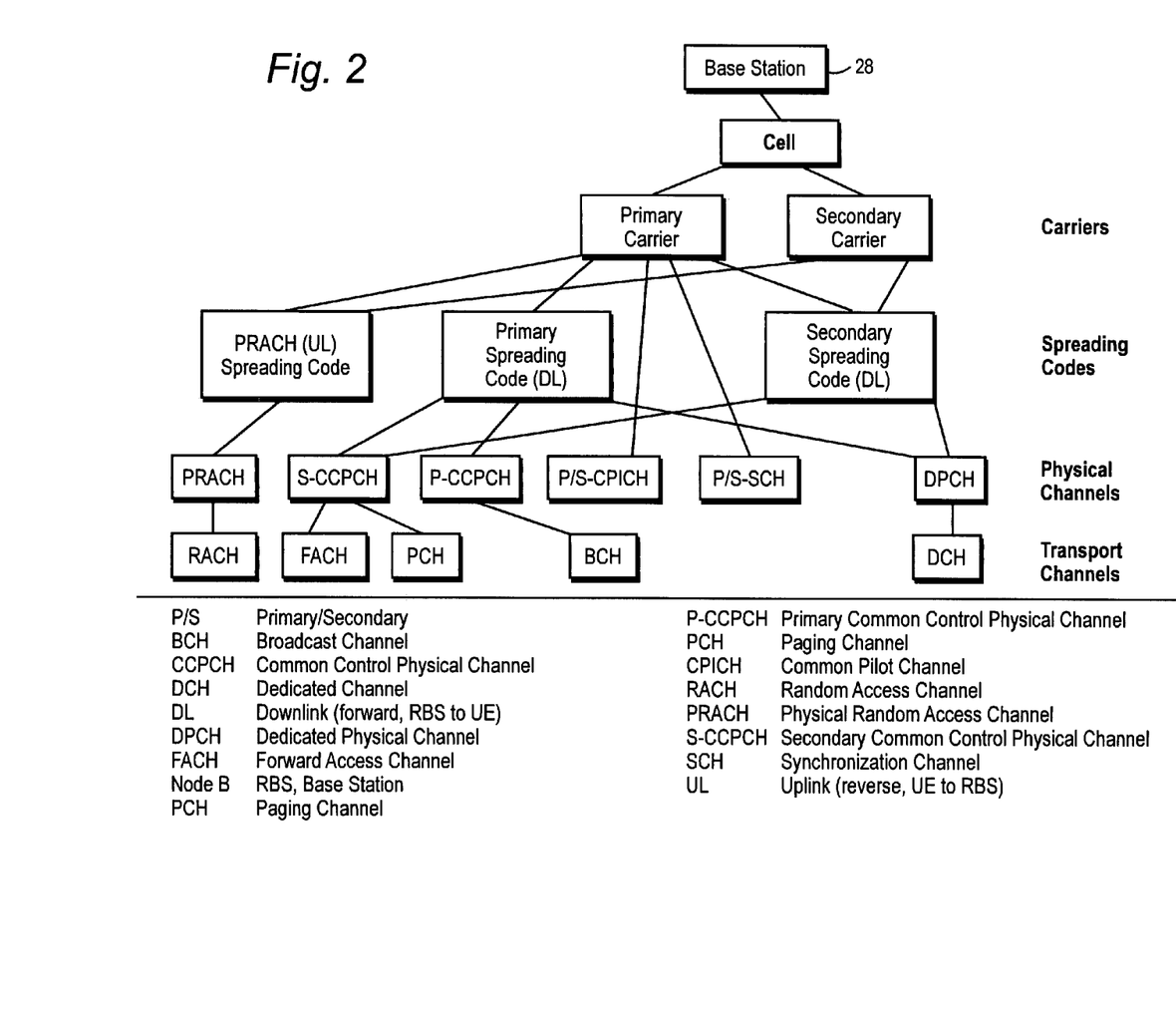
FIG. 2 illustrates conceptually cell resources that may be allocated to a single cell in a base station.

Further understanding of an exemplary context in which the instant invention may be utilized is outlined in the example illustration of potential components of a single base station (BS) cell in FIG. 2. The cell includes a primary carrier and zero or more secondary carriers that primarily provide additional traffic channels. Each carrier can encompass a wide frequency band, e.g., 5 MHz, in a WCDMA system. The primary carrier of a cell has one primary spreading code and zero or more secondary spreading codes. A spreading code may include both a scrambling code and a channelization code. Each secondary carrier of a cell (if any) has one or more secondary spreading codes. The number of secondary carriers may differ in the downlink direction (base station-to-mobile station) from the uplink direction (mobile station-to-base station). Associated with each channelization code is one or more physical channels, such as a common control physical channel (CCPCH), that may be mapped to one or more transport channels.

Figure 8:
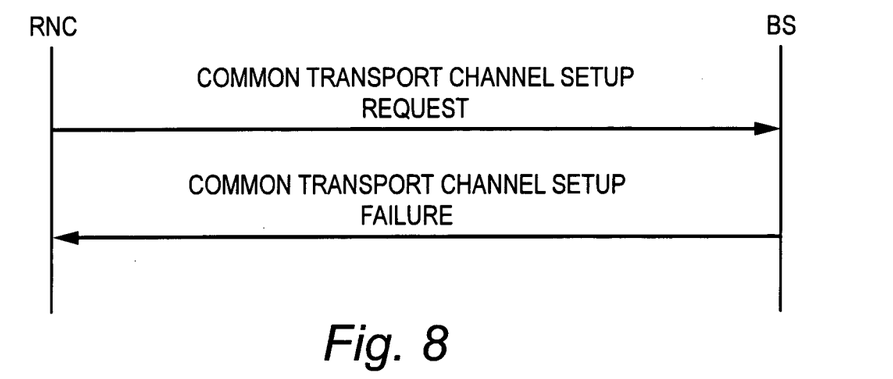
FIG. 8 is a message diagram illustrating the sending of a channel setup message and the receiving of a negative/failure response in view of same according to an exemplary embodiment of this invention.

As can be seen in FIG. 2, the transport channels PCH and FACH may be mapped to the physical channel SCCPCH. When the RNC 26 desires to set up the SCCPCH physical channel, it sends a COMMON TRANSPORT CHANNEL SETUP REQUEST message to the BS 28 (e.g., see FIGS. 7–8). Included in this setup request message sent by the RNC are parameters indicative of the physical channel to be used in the setup. These parameters include cell ID, cell carrier ID, DL scrambling code ID, DL channelization code ID or number, etc. When the setup request is approved, the BS sends the RNC an approving response message (FIG. 7), but when not approved sends the RNC a failure/reject message (FIG. 8). When approved, the BS 28 configures its hardware to accommodate the new physical channel SCCPCH.

Figure 9:
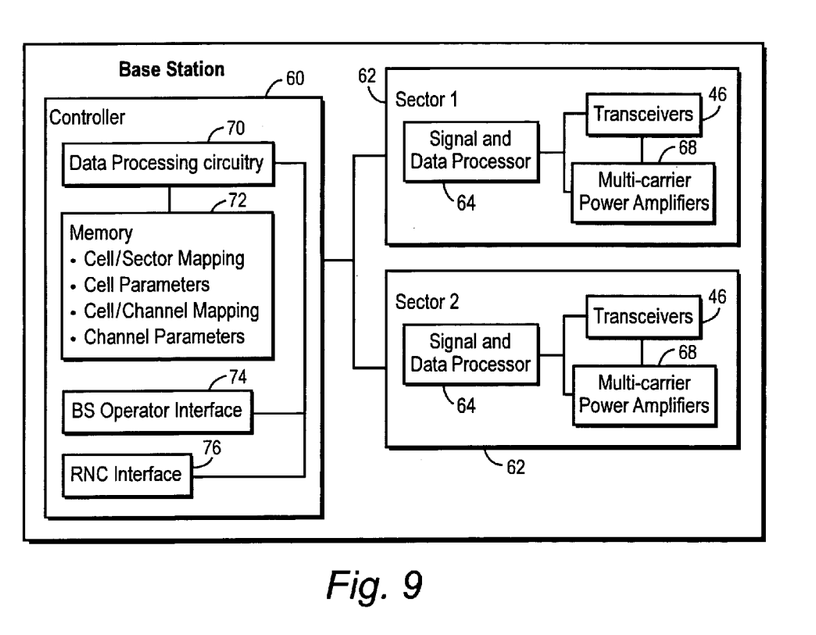
FIG. 9 is a function block diagram illustrating a simplified base station (BS) according to an exemplary embodiment of this invention.

A simplified function block diagram of an exemplary BS 28 that may be used to implement the present invention is shown in FIG. 9. The base station 28 includes a controller 60 coupled to one or more sectors 62. Each sector 62 includes signal and data processing hardware and software 64 coupled to plural radio transceivers 46 and multi-carrier power amplifiers 68. The base station controller 60 includes data processing circuitry (i.e., processor) 70 coupled to memory 72, a base station operator interface 74, and an RNC interface 76. The memory 72 may store programming and data including cell/sector mapping software and tables, cell parameters, cell ID/cell resource ID mapping software and tables, and cell resource (e.g., channel) parameters. BS memory 72 thus stores parameters (e.g., cell ID, cell carrier ID, DL scrambling code ID, DL channelization code ID or number, etc.) for each common physical channel that has been setup by the BS 28.

Thus, referring to FIGS. 1, 3 and 9, a BS 28 receives a COMMON TRANSPORT CHANNEL SETUP REQUEST message from an RNC 26, such message including the parameters discussed above indicative of the physical channel requested (step 1 in FIG. 3). This message may be sent to the BS 28 when the BS begins operation, when a transport channel is added, or at a time when a change in mapping of transport channel(s) is desired. BS 28 receives this message via RNC interface 76. Processor 70 at the BS then compares (or causes to be compared) one or more of the physical channel indicating parameters (e.g., cell ID, cell carrier ID, etc.) in the received setup request message with parameters stored in memory 72 relating to common channels already set up by the BS (step 2 in FIG. 3). Processor 70 then uses the results of the comparison to determine whether or not the channel identified in the setup request message is already being used by another transport channel(s) (step 3 in FIG. 3).

Figure 4:
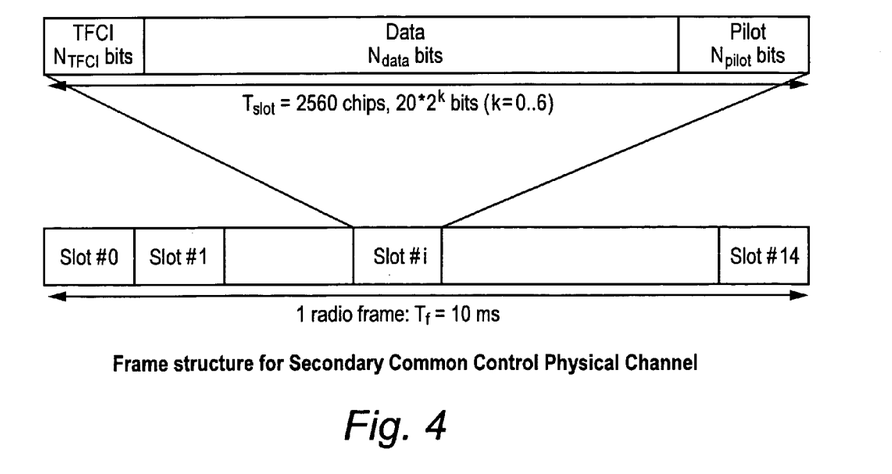
FIG. 4 is a diagram of the frame structure for a SCCPCH according to an exemplary embodiment of this invention.
Figure 5:
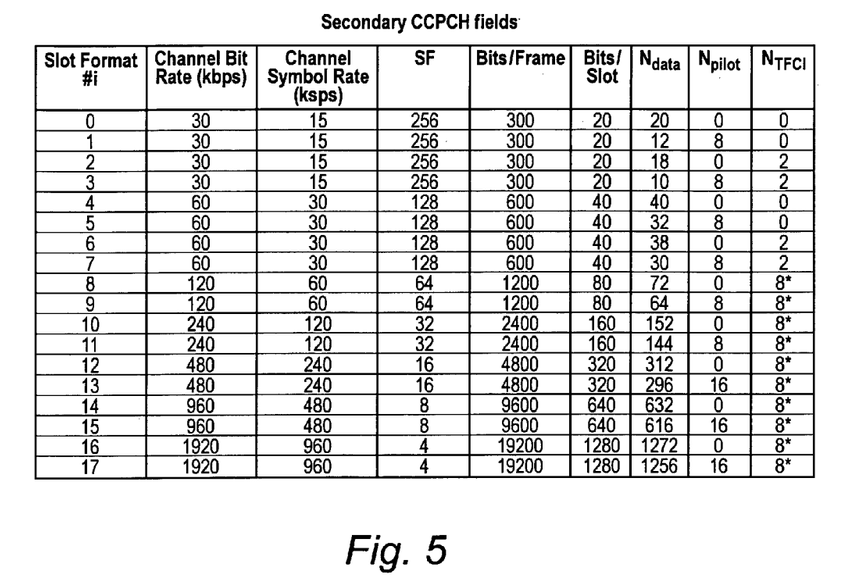
FIG. 5 is a chart illustrating different SCCPCH fields according to different embodiments of this invention.

Once the SCCPCH is set up at the BS 28, the BS utilizes the SCCPCH to carry the FACH and PCH over the radio interface I/F to mobile stations 30. FIG. 4 illustrates an exemplary frame structure for a SCCPCH. Physical channels such as the SCCPCH are defined by a specific carrier frequency, scrambling code, channelization code (optional), and time start and stop (giving a duration) on the DL. Time durations may be defined by start and stop instants, measured in integer multiples of chips. For example, the SCCPCH radio frame shown in FIG. 4 includes fifteen (15) slots. The length of an exemplary frame corresponds to 38400 chips. Thus, a slot is a duration which consists of fields containing bits, and the length of a slot may correspond to 2560 chips. As explained previously, transport channels are capable of being mapped to physical channels. Referring to FIG. 4, the information from the transport channels FACH and PCH may be mapped into the data slots of the FIG. 4 SCCPCH radio frame (i.e., FACH and PCH may be mapped to the same frame in certain embodiments, and to different frames in other embodiments). TFCI bits are optional, and need not be included in all SCCPCH frames. Exemplary numbers of bits per field in different exemplary SCCPCH formats are shown in FIG. 5.

Figure 6:
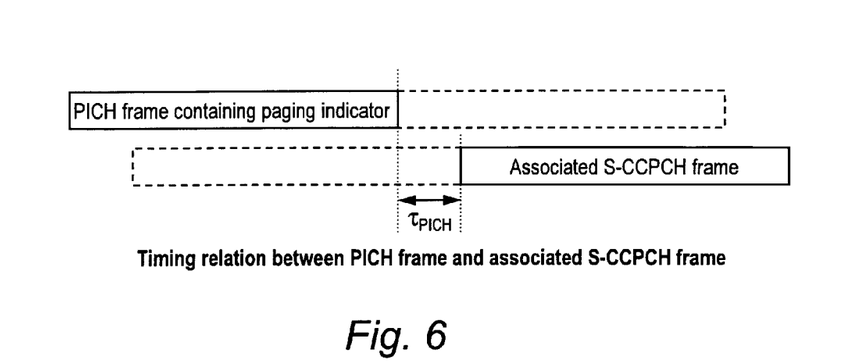
FIG. 6 is illustrates the timing relationship/offset between a SCCPCH frame and an associated PICH frame according to an exemplary embodiment of this invention.
Figure 7:
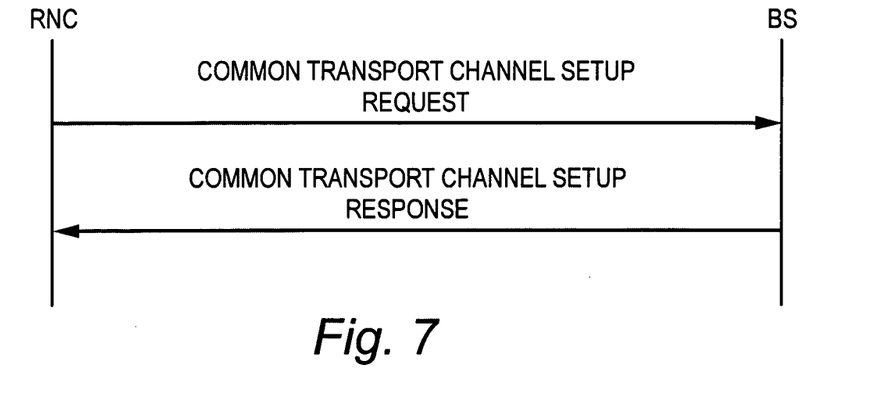
FIG. 7 is a message diagram illustrating the sending of a channel setup message and the receiving of an affirmative response in view of same according to an exemplary embodiment of this invention.

In order to illustrate an exemplary context of the PCH aspect of the SCCPCH, FIG. 6 illustrates the timing relation from a BS to a MS between a PICH (Page Indicator Channel) frame and its associated SCCPCH frame (i.e., the SCCPCH frame that carries the paging information related to the paging indicators in the PICH frame). A paging indicator set in a PICH frame means that the paging message is transmitted from the BS on the PCH in the SCCPCH frame starting $T_{PICH}$ chips after the transmitted PICH frame.

Figure 10:
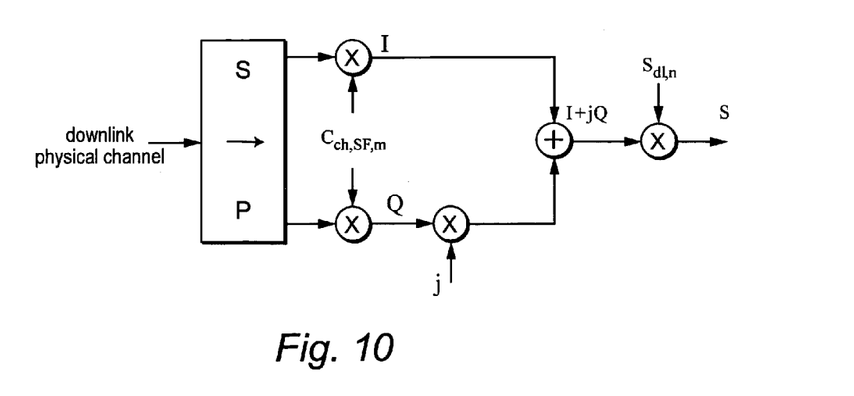
FIG. 10 is a diagram illustrating spreading of a downlink physical channel according to an embodiment of this invention.

In order to send SCCPCH radio frames over the I/F to mobile stations 30, BS uses the CDMA technique shown in FIG. 10. The non-spread physical channel that is input consists of a sequence of real-valued symbols (e.g., +1, −1, 0). Each pair of two consecutive symbols is first serial-to-parallel converted and mapped to an I and Q branch respectively. The I and Q branches are then spread to the chip rate desired by the same real-valued channelization code $C_{ch,\ SF,\ m}$. The sequences of real-valued chips on the I and Q branches are then scrambled (e.g., complex chip-wise multiplication) by a complex-valued scrambling code $S_{dl,\ n}$, so that the CDMA signal may be sent to MS(s) 30 in a cell of the BS.

Figure 11:
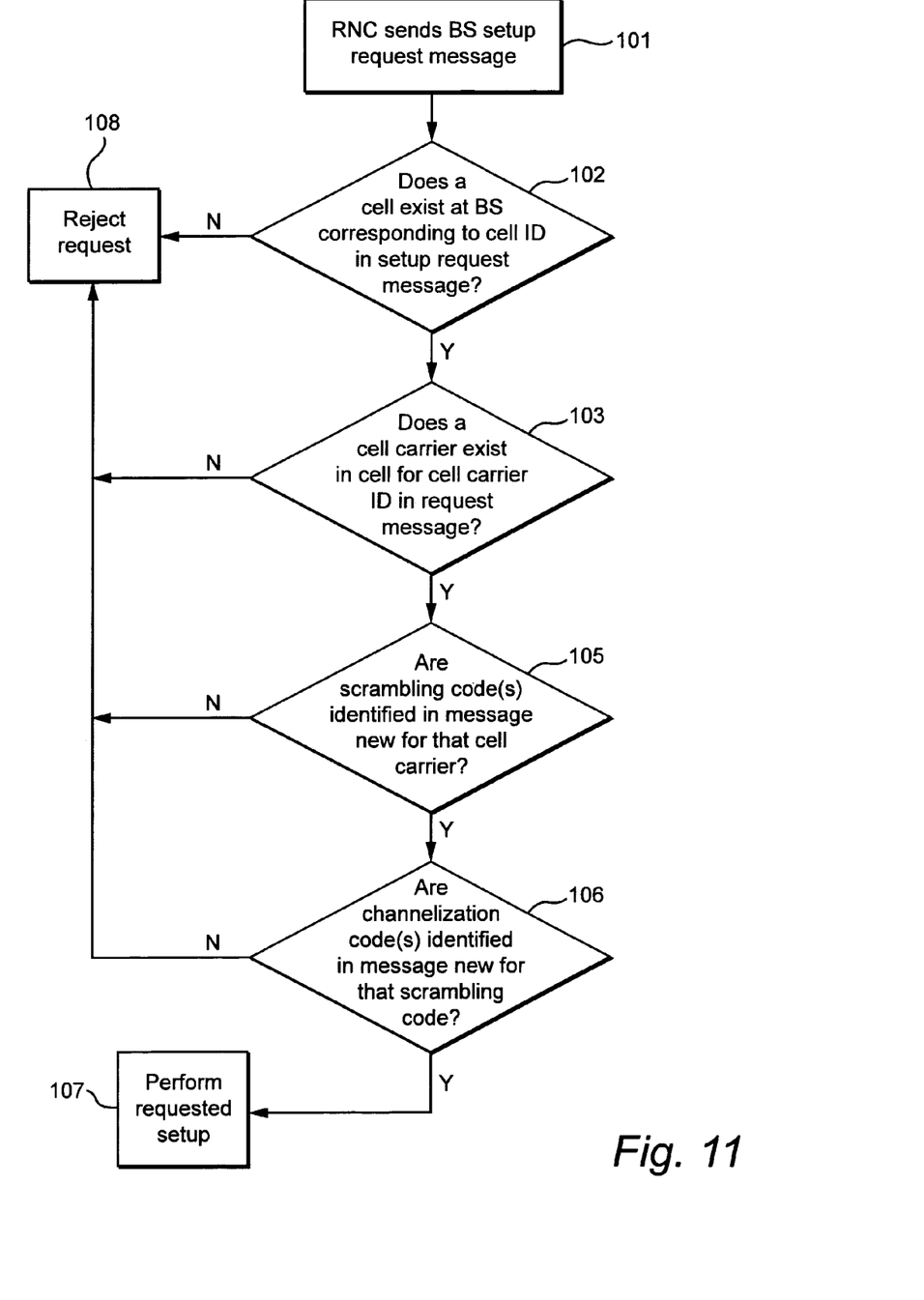
FIG. 11 is a flowchart illustrating certain steps taken in accordance with an exemplary embodiment of this invention.

In addition to the FIG. 3 embodiment of this invention, FIG. 11 is a flowchart of yet another embodiment of this invention where the determination is used in deciding whether or not to accept a physical channel setup request. As can be seen in the FIG. 11 embodiment, the BS 28 first receives a setup request message (e.g., a COMMON TRANSPORT CHANNEL SETUP REQUEST message) from RNC 26 (step 101). Processor 70 at the BS determines whether a cell exists at the BS corresponding to the cell ID parameter included in the received setup request message (step 102). This comparison is carried out by comparing, for example, the cell ID parameter from the setup request message with previously stored cell IDs in memory 72 corresponding to physical channel(s) already set up by the BS. If not, then the processor 70 causes the BS to reject the setup request (e.g., see FIG. 8) (step 108). If so, then the flow moves on and the processor 70 determines whether a cell carrier exists at the BS for the identified cell (step 103). Again, this is done by comparing the cell ID and cell carrier parameters from the received setup request message with previously stored cell ID and cell carrier parameters in memory 72 for common physical channels already set up by the BS. If not, then the setup is rejected (step 108). If so, then the flow moves on and the processor 70 determines whether the scrambling code identified in the received setup request message is new for the identified carrier (step 105). Again, this is done by comparing the cell carrier and scrambling code parameters from the received setup request message with previously stored cell carrier and scrambling code parameters in memory 72 for common physical channels already set up by the BS. If not, then the setup request is rejected (step 108). If so, then the flow moves on and the processor 70 determines whether the channelization code identified in the received setup request message is new for the identified scrambling code (step 106). Again, this is done by comparing the scrambling code and channelization code parameters from the received setup request message with previously stored scrambling code and channelization code parameters in memory 72 for common physical channels already set up by the BS. If not, then the setup request is rejected (step 108). If so, then the setup is carried out and the BS configures its hardware accordingly (step 107). As can be seen, the FIG. 11 embodiment differs from previous embodiments of this invention, because in FIG. 11 the BS uses the invention to determine whether or not to reject a received physical channel setup request. It will be recognized by those skilled in the art that all steps shown in FIG. 11 need not be performed in all embodiments of this invention, and variations of the FIG. 11 embodiment may utilize only one, two or three of the steps shown in FIG. 11.

Figure 12:
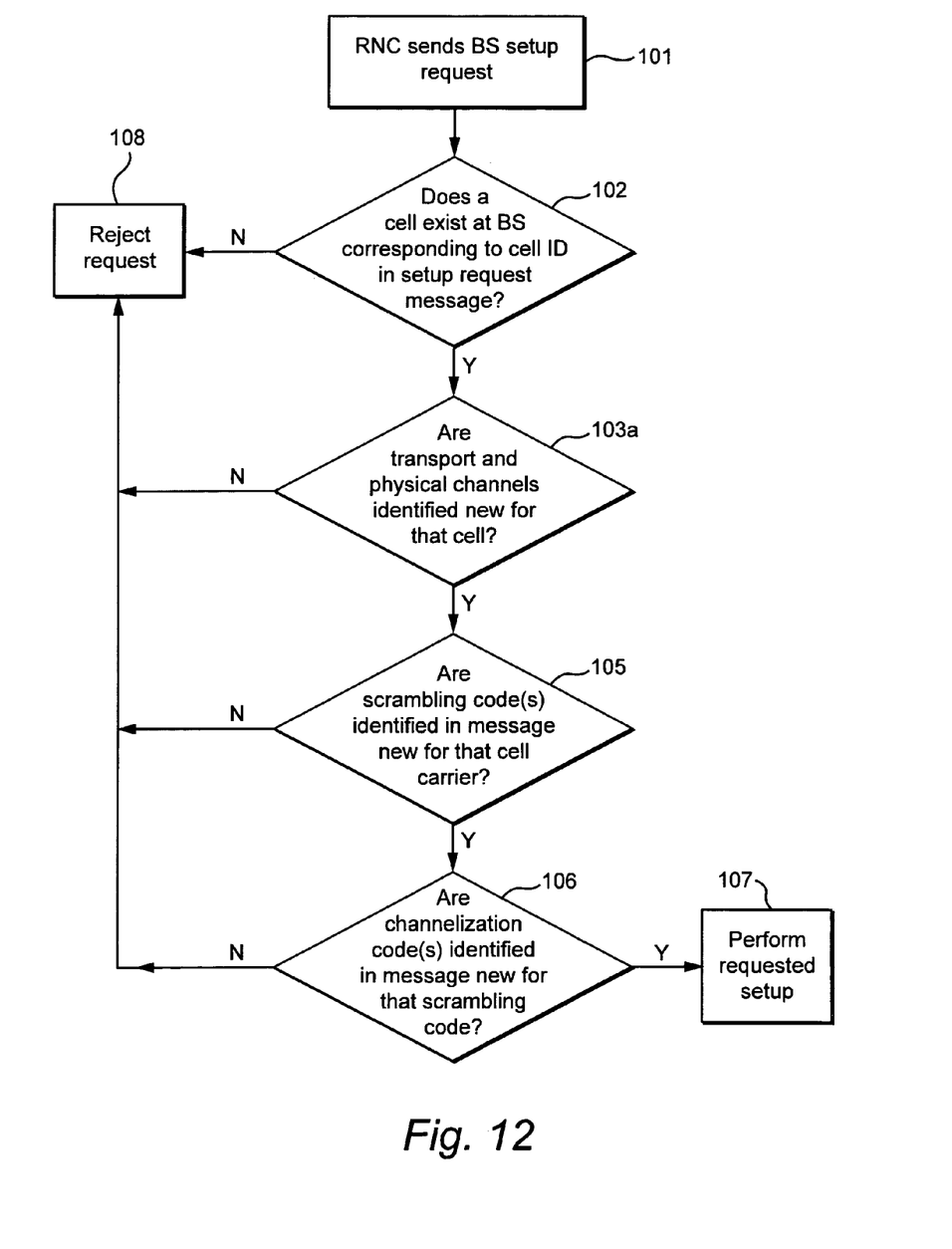
FIG. 12 is a flowchart illustrating certain steps taken in accordance with another exemplary embodiment of this invention.

In addition to the FIG. 3 and FIG. 11 embodiments of this invention, FIG. 12 is a flowchart of yet another embodiment of this invention where the determination is used in deciding whether or not to accept a physical channel setup request. The FIG. 12 embodiment is similar to the FIG. 11 embodiment, except that the carrier ID step has been removed (i.e., step 103 from FIG. 11 has been removed), and a new step 103*a* has been added. In step 103*a*, physical and transport channel IDs are compared by those already set up for the cell. If the transport and physical channels identified are new for that cell, then the process proceeds to step 105. Otherwise, the request is rejected. Like other embodiments herein, this embodiment may be utilized in the context of both common and dedicated channels.

In addition to the FIG. 3 embodiment of this invention, FIG. 11 is a flowchart of yet another embodiment of this invention where the determination is used in deciding whether or not to accept a physical channel setup request.

While the present invention has been described with respect to a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Additionally, the invention may be implemented for channel setups other than SCCPCH setups. For example, the invention may also be used in the context of dedicated channel setups. Accordingly, it is intended that the invention be limited only by the scope of the claims appended hereto.

What is claimed is:

1. In a code division multiple access (CDMA) cellular telecommunications network, a method of determining whether a physical channel is already being used by a transport channel, the method comprising:
   a base station (BS) of the network receiving a setup request message from a radio network controller (RNC) of the network requesting that the base station set up a physical channel to be used for mapping first and second transport channels to the physical channel so that information of the transport channels may be sent via a radio interface (I/F) to one or more mobile stations in a cell of the base station; and
   the base station using one or more parameters included in the setup request message in determining whether or not the physical channel corresponding to the setup request message is already being used at the base station by any other transport channel.

2. The method of claim 1, wherein the parameters include a cell ID parameter, a downlink scrambling code ID parameter, and a downlink channelization code number ID parameter.

3. The method of claim 2, wherein the parameters further include a cell carrier ID parameter.

4. The method of claim 1, wherein the base station compares at least two of the parameters included in the setup request message with parameters previously stored in a memory of the base station in order to determine whether or not the physical channel corresponding to the setup request message is already being used at the base station by any other transport channel.

5. The method of claim 4, wherein the setup request message is a COMMON TRANSPORT CHANNEL SETUP REQUEST message sent from the RNC to the BS, the physical channel is a Secondary Common Control Physical Channel (SCCPCH), and the first and second transport channels comprise a paging transport channel and a forward access channel, respectively.

6. The method of claim 1, wherein the base station makes a determination as to whether or not to reject the requested setup based at least in part upon results of said determining of whether or not the physical channel corresponding to the setup request message is already being used at the base station by any other transport channel.

7. In a cellular telecommunications network, a method of determining whether a physical channel is already being used by a transport channel, the method comprising:
   a first node of the network receiving a setup request message from a second node of the network, the setup request message requesting that the first node set up a physical channel to be used for mapping at least one transport channel to the physical channel so that information of the transport channel may be sent to one or more mobile stations; and
   the first node using one or more parameters included in the setup request message in determining whether or not the physical channel corresponding to the setup request message is already being used at the first node by any other transport channel.

8. The method of claim 7, wherein the first node comprises a base station and the second node comprises a radio network controller.

9. The method of claim 7, further comprising the first node comparing at least two of the parameters included in the setup request message with parameters previously stored in a memory of the first node in order to determine whether or not the physical channel corresponding to the setup request message is already being used at the first node by any other transport channel, and wherein the parameters previously stored in the memory of the first node are parameters relating to physical channels previously set up by the first node.

10. The method of claim 7, wherein the setup request message is a COMMON TRANSPORT CHANNEL SETUP REQUEST message sent from an RNC (second node) to a BS (first node), the physical channel is a Secondary Common Control Physical Channel (SCCPCH), and the first and second transport channels comprise a paging transport channel and a forward access channel, respectively.

11. The method of claim 7, further comprising the first node determining whether or not to reject the requested setup based at least in part upon results of said determining of whether or not the physical channel corresponding to the setup request message is already being used by any other transport channel.

12. A base station for use in a cellular telecommunications network, the base station comprising:
   an interface over which the base station is adapted to receive a physical channel setup request message from a controller node, the message for requesting the base station to set up a physical channel so that first and second transport channels may be mapped onto said physical channel; and
   a memory in which the base station stores parameters relating to physical channels set up by the base station; and
   a processor for comparing one or more parameters included in the physical channel setup request message with one or more parameters stored in said memory in order to determine whether or not a physical channel corresponding to the physical channel setup request message is already being used at the base station by another transport channel different than the first and second transport channels.

13. The base station of claim 12, wherein the setup request message is a COMMON TRANSPORT CHANNEL SETUP REQUEST message to be sent from the controller node to the base station, the physical channel is a Secondary Common Control Physical Channel (SCCPCH), and the first and second transport channels comprise a paging transport channel and a forward access channel, respectively.

14. The base station of claim 12, wherein the processor makes a determination as to whether or not to reject the requested physical channel setup based at least in part upon results of said determining of whether or not the physical channel corresponding to the setup request message is already being used at the base station by another transport channel.

15. In a code division multiple access (CDMA) cellular telecommunications network, a method of determining whether a physical channel is allocated, the method comprising:
- a base station (BS) of the network receiving a setup request message from a radio network controller (RNC) of the network requesting that the base station set up a physical channel to be used for mapping first and second transport channels to the physical channel so that information of the transport channels may be sent via a radio interface (I/F) to one or more mobile stations in a cell of the base station; and
- the base station using one or more parameters included in the setup request message in determining whether or not the physical channel corresponding to the setup request message is allocated at the base station by any other transport channel.

16. The method of claim 15, wherein the parameters include a cell ID parameter, a downlink scrambling code ID parameter, and a downlink channelization code number ID parameter.

17. The method of claim 16, wherein the parameters further include a cell carrier ID parameter.

18. The method of claim 15, wherein the base station compares at least two of the parameters included in the setup request message with parameters previously stored in a memory of the base station in order to determine whether or not the physical channel corresponding to the setup request message is allocated at the base station to any other transport channel.

* * * * *